Sept. 24, 1963  R. A. GRAY, JR  3,104,681
PLASTIC CLOSURES FOR PROTECTIVE USE
Filed Jan. 6, 1960
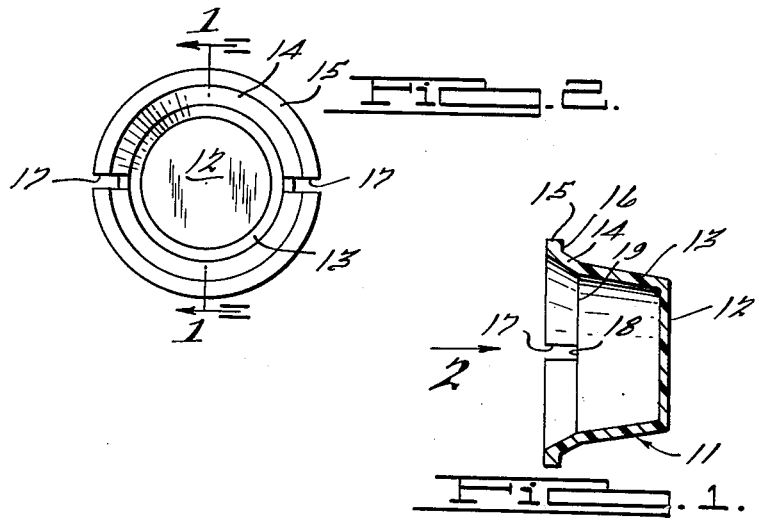
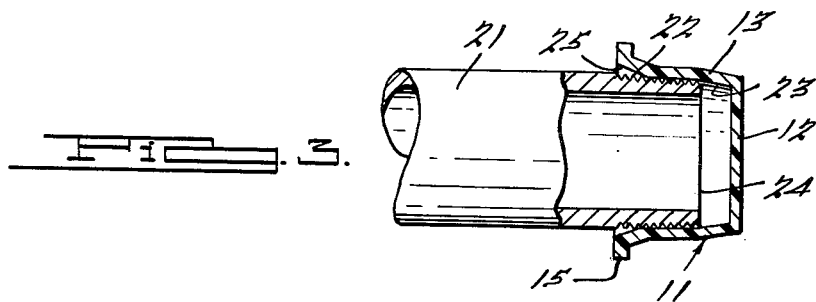
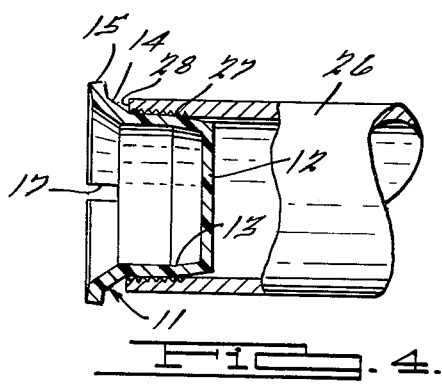
INVENTOR.
Robert A. Gray, Jr.
BY
Harness, Dickey & Pierce
ATTORNEYS.

United States Patent Office

3,104,681
Patented Sept. 24, 1963

3,104,681
PLASTIC CLOSURES FOR PROTECTIVE USE
Robert A. Gray, Jr., Port Huron, Mich., assignor to Mueller Brass Co., Port Huron, Mich., a corporation of Michigan
Filed Jan. 6, 1960, Ser. No. 862
2 Claims. (Cl. 138—96)

This invention relates to closures, and more particularly to closure members fabricated of plastic material for use as protective coverings for pipe ends and fitting ends such as refrigerant system tubing or fittings which must be kept dirt-free, moisture-free and protected from damage before installation.

It is an object of the present invention to provide a novel and improved plastic closure construction for protection, which may be quickly and easily applied to a part and which is especially adapted for rapid removal with a minimum of effort when the part is to be used.

It is another object to provide an improved plastic closure member of this nature which may be utilized for protecting either internal openings or external diameters, and which will be firmly retained in place until removed.

It is also an object to provide an improved plastic closure member of the above character which is adapted to be easily removed from the inside of an opening, or from an external diameter, either by a simple squeezing movement between the fingers or by tearing the closure member.

Other objects, features, and advantages of the present invention will become apparent from the subsequent description, taken in conjunction with the accompanying drawings.

FIGURE 1 is a side elevational view in cross-section of a preferred embodiment of the novel plastic closure member taken along the line 1—1 of FIGURE 2;

FIGURE 2 is an end elevational view of the closure member looking in the direction of the arrow 2 of FIGURE 1;

FIGURE 3 is a side elevational view partially in cross-section of a pipe end having an external thread with the closure member mounted thereon; and FIGURE 4 is a view similar to FIGURE 3 showing an internally threaded pipe end with the closure in position.

In general terms, the invention comprises a generally cup-shaped closure member fabricated of a resilient plastic material, the member having a size dependent upon the diameters with which it will be associated. The closure member has a flat end portion and a first annular wall portion extending therefrom in slightly flared fashion. A second annular wall portion is contiguous with the first portion and extends therefrom with a more pronounced flare, the depth of the second wall portion being somewhat less than that of the first portion. An outwardly extending annular flange is formed at the outer edge of the second wall portion. A plurality of slots are formed in the flange, these slots being circumferentially spaced and extending into the second wall portion. The size and spacing of these slots are such that, upon squeezing of the flange and outer wall portion between the fingers to an elliptical shape, the frictional force holding the closure to the inner wall portion to the tubing will be reduced sufficiently to enable withdrawal of the closure. Alternatively, one section of the flange and outer wall portion may be gripped between the fingers and the closure torn apart starting at one of the slots.

Referring more particularly to the drawings, a closure member is generally indicated at 11 and comprises a generally cup-shaped member which may be fabricated by any of various conventional methods of a plastic material such as polyethylene which, at normal temperatures, will exhibit sufficient resiliency and resistance to moisture and foreign matter to enable it to be used as a protective cover for workpieces such as refrigerant tubing ends. The thickness of member 11 is preferably such that after installation, it will be capable of resisting impact which might otherwise damage the thread or pipe on which it is mounted.

The closure member comprises a flat end wall 12 of circular shape, the diameter of this end wall being properly chosen in accordance with the pipe diameter with which the closure member will be associated. A first annular wall portion 13 extends toward one side of end 12, this wall portion being slightly flared, that is, having a frusto-conical shape as seen in FIGURE 1. Wall portion 13 may be also termed the gripping portion, and the degree of its flare will be such that it may be forced over or into a tubing end, in such a manner that the pipe or its threads will be in firm frictional contact therewith.

Extending outwardly from gripping portion 13 of the closure member is a second wall portion 14 which may be also termed the spacing portion. Wall portion 14 has a somewhat greater angle of flare than portion 13, as seen in FIGURE 1, but its depth is substantially less than that of gripping portion 13.

A flange 15 extends outwardly from the outer edge of spacing portion 14. This flange is relatively narrow, being sufficient to enable one to grip the back surface 16 of the flange with the fingers when it is desired to remove the closure member from the inside of a tubing end. A plurality of slots 17 are formed in flange 15 and spacing portion 14 of the closure member. These slots extend axially, two such slots being shown in the illustrated embodiment spaced 180° apart, as seen in FIGURE 2. Preferably, the bottom 18 of each slot is approximately at the juncture 19 of wall portions 13 and 14. The width of slots 17 is such as to enable an operator grasping flange 15 on the outer surface of wall portion 14 between his fingers to squeeze these two portions of the closure member so as to bring their opposite sides together, thus causing this portion of the closure member to assume a somewhat elliptical shape.

In considering the use and operation of the novel closure member, reference is made to FIGURES 3 and 4. Assuming for example, that a metal tube 21 having an externally threaded end portion 22 is desired to be protected, closure member 11 will be slipped onto the tube end and forced over threaded portion 22, as seen in FIGURE 3. Preferably, the diameter of the inner surface 23 of wall portion 13 is so chosen as to insure a firm grip on the tube threads before end 12 of the closure has engaged edge 24 of the tube. It will be noted that an annular space 25 will be provided between spacing portion 14 of the closure and the tube 21. The closure may thus be easily removed from the tube end.

As indicated previously, the novel closure member construction is especially adapted for application to the internal surface of a tube end. A tube 26 having an internal thread 27 at one end thereof is illustrated in FIGURE 4. Closure member 11 is so chosen that the external size of its wall portion 13 is such as to fit tightly within threaded portion 27 when the closure member is pressed into the end of the tube, but portion 14 of the closure member is flared sufficiently to prevent end 28 of the tube from engaging flange portion 15 of the closure member. A space is thus left between the tube end and the flange to permit the operator to grip the closure member. Upon squeezing flange portion 15 and wall portion 14 into a somewhat elliptical shape, the frictional force between portion 13 of the closure member and threaded portion 27 of the tube will be reduced sufficiently to enable the operator to pull the closure member from the tube. Alternatively, the operator may grasp one portion of flange 15 and wall portion 14 of the closure member and tear the closure member, starting with either slot 17.

It should be observed that in the application of the novel closure member to either an internal or an external surafce as shown in FIGURES 3 and 4, means other than the operator's fingers, for example pliers, could be used to remove the closure. It should also be noted that each size of closure member will be usable with several diameters of tubing, depending on whether it is applied internally or externally, and that the closure is equally applicable to threaded or smooth surfaces.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a closure member for tubing ends or the like, a thin-wall cup-shaped element of resilient material having an end wall, an annular gripping wall extending to one side of said end wall, both the inner and outer surfaces of said gripping wall being slightly outwardly flared whereby the outer surface of said gripping wall is adapted to frictionally engage the inside of a tubing end and the inner surface of said gripping wall is adapted to frictionally engage the outside of a tubing end of smaller diameter, an annular spacing wall extending from said gripping wall and having a sharper flare, and an outwardly directed flange at the wider end of said spacing wall, said wider end of the spacing wall forming the inner boundary of said closure member inside said flange, the spacing wall forming a space with the tubing end upon which it is used to permit easy removal of the closure member by compression of said flange to reduce the frictional contact between said gripping wall and the tubing end.

2. A closure member according to claim 1, further provided with at least one substantially axially extending slot in said flange and spacing wall to facilitate removal of said closure member from a tubing end.

References Cited in the file of this patent

UNITED STATES PATENTS

| | | |
|---|---|---|
| 2,013,527 | Sherman | Sept. 3, 1935 |
| 2,055,646 | Bosley | Sept. 29, 1936 |
| 2,195,530 | Curtis | Apr. 2, 1940 |
| 2,580,762 | Greniere et al. | Jan. 1, 1952 |
| 2,730,136 | Phillips | Jan. 10, 1956 |
| 2,836,214 | Rapata | May 27, 1958 |
| 2,873,765 | Gregory | Feb. 17, 1959 |
| 2,947,463 | Conklin | Aug. 2, 1960 |

FOREIGN PATENTS

| | | |
|---|---|---|
| 122,781 | Sweden | Sept. 21, 1948 |
| 689,487 | Great Britain | Mar. 25, 1953 |
| 1,111,742 | France | Nov. 2, 1955 |